(12) United States Patent
Morozumi

(10) Patent No.: US 8,374,747 B2
(45) Date of Patent: Feb. 12, 2013

(54) FAILURE DIAGNOSTIC APPARATUS AND METHOD OF STORING FAILURE INFORMATION

(75) Inventor: Hiroki Morozumi, Toyota (JP)

(73) Assignee: Toyota Jidosha Kabushiki Kaisha, Toyota-Shi, Aichi-Ken (JP)

(*) Notice: Subject to any disclaimer, the term of this patent is extended or adjusted under 35 U.S.C. 154(b) by 204 days.

(21) Appl. No.: 12/801,750

(22) Filed: Jun. 23, 2010

(65) Prior Publication Data

US 2010/0292891 A1 Nov. 18, 2010

Related U.S. Application Data

(63) Continuation of application No. 11/699,556, filed on Jan. 30, 2007, now abandoned.

(30) Foreign Application Priority Data

Feb. 2, 2006 (JP) .................................. 2006-026228

(51) Int. Cl.
*G01M 17/00* (2006.01)
*G06F 7/00* (2006.01)
*G06F 19/00* (2011.01)

(52) U.S. Cl. ..................................... 701/33.4
(58) Field of Classification Search ......... 701/29.1–34.4
See application file for complete search history.

(56) References Cited

U.S. PATENT DOCUMENTS

| 2002/0029576 | A1 | 3/2002 | Renders | |
| 2006/0064232 | A1* | 3/2006 | Ampunan et al. | 701/115 |

FOREIGN PATENT DOCUMENTS

| JP | 2-49772 | 4/1990 |
| JP | 7-181112 | 7/1995 |
| JP | 2002-235599 | 8/2002 |
| JP | 2003-104137 | 4/2003 |

OTHER PUBLICATIONS

Notification of Reason(s) for Refusal for JP Appl. No. 2006-026228 dated Nov. 18, 2008.

* cited by examiner

*Primary Examiner* — Khoi Tran
*Assistant Examiner* — Bhavesh V Amin
(74) *Attorney, Agent, or Firm* — Finnegan, Henderson, Farabow, Garrett & Dunner, L.L.P.

(57) ABSTRACT

A failure diagnostic apparatus determines the environment in which the condition of a vehicle is examined and selects an appropriate storage location for information regarding the condition of the vehicle. In particular, the failure diagnostic apparatus includes a vehicle-condition diagnostic portion, a plurality of failure-information storage portions, a diagnostic-environment determination portion, and a storage selection portion. When the vehicle-condition diagnostic portion determines that a failure has occurred, the diagnostic-environment determination portion determines the environment in which the condition of the vehicle is examined. Then, based on the diagnostic environment determined by the diagnostic-environment determination portion, the storage selection portion selects at least one storage portion of the plurality of failure-information storage portions to store information regarding the failure.

7 Claims, 3 Drawing Sheets

F I G . 3
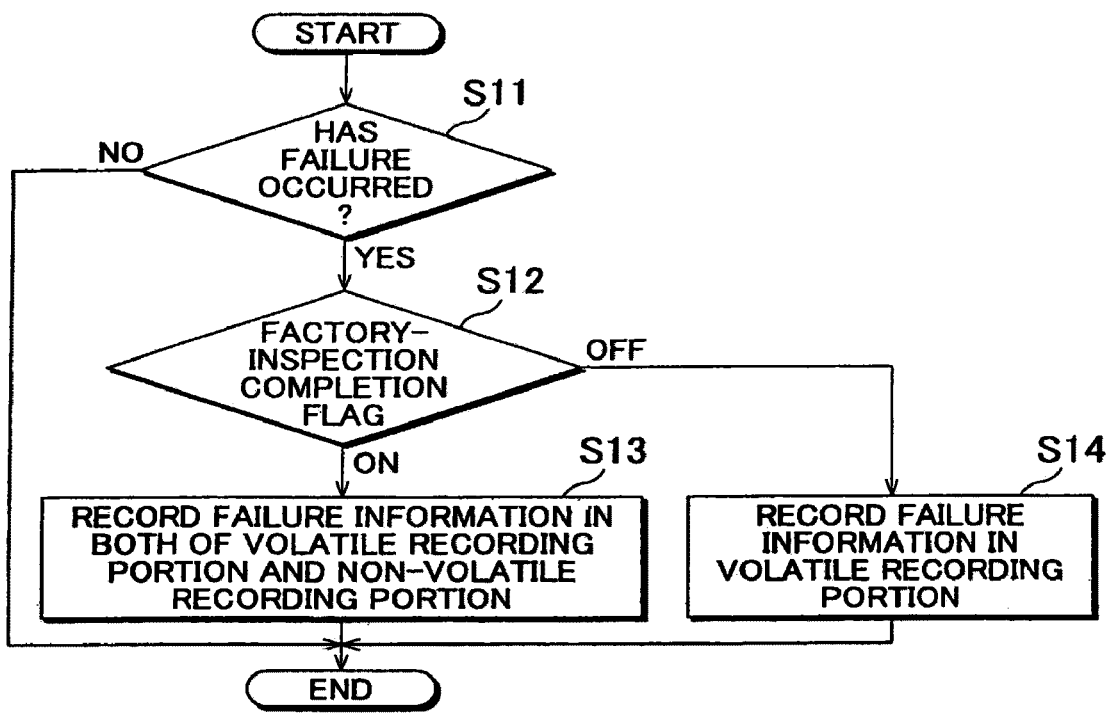

FAILURE DIAGNOSTIC APPARATUS AND METHOD OF STORING FAILURE INFORMATION

REFERENCE TO RELATED APPLICATIONS

This is a continuation of U.S. application Ser. No. 11/699,556, filed Jan. 30, 2007, now abandoned which claims the benefit of Japanese Patent Application No. 2006-26228, filed on Feb. 2, 2006, both of which are incorporated herein by reference in their entirety.

BACKGROUND OF THE INVENTION

1. Field of the Invention

The invention relates to a failure diagnostic apparatus and a method of storing information failure. More particularly, the invention relates to a failure diagnostic apparatus and a method of storing failure information that easily determine the environment in which the condition of a vehicle is examined.

2. Description of the Related Art

Recently, it has been made mandatory to provide an On-Board Diagnostic-II (hereinafter, referred to as "OBD-II") system in vehicles such as automobiles, to prevent air pollution. The OBD-II system provides a warning to a driver if a failure occurs in an exhaust gas control device. In the OBD-II system, information regarding a failure is stored in non-volatile memory of an Electronic Control Unit (hereinafter, referred to as "ECU").

More specifically, in the OBD-II system, a Diagnostic Trouble Code (hereinafter, referred to as "DTC"), which contains information about a failure, is stored in the non-volatile memory. The DTC stored in the non-volatile memory is later retrieved using a scan tool so that the cause of the failure can be determined. The scan tool is a device dedicated to retrieving the DTC. After the cause of the failure is determined, and the cause of the failure is corrected by appropriate repair, the DTC stored in the non-volatile memory is erased using the erase function of the scan tool.

Japanese Utility Model Application Publication No. 2-49772 describes an airbag system that includes volatile memory and non-volatile memory provided in an ECU. The volatile memory or the non-volatile memory is appropriately selected to store the information about a failure that occurs in, for example, a collision detection portion in the airbag system. The response speed of the volatile memory is high, and the volatile memory is suitable for temporarily retaining records. Therefore, information that is frequently updated is stored in the volatile memory. For example, if a failure time is updated every one second or every one minute, the information on the failure time is stored in the volatile memory. In contrast, the non-volatile memory is suitable for permanently retaining records. Therefore, the information that is not updated frequently is stored in the non-volatile memory. For example, if the failure time is updated once every hour, the failure time is stored in the non-volatile memory.

Emission regulations tend to be tightened to take further measures against air pollution. Therefore, further requirements for the OBD-II system will be set. Particularly, it will be required to prohibit the DTC stored in the non-volatile memory from being erased by the scan tool, to more reliably retain the DTC.

In the system described in the above-described publication, the DTC about a failure is stored in the non-volatile memory. Therefore, even if a failure occurs, for example, in an assembly process when a vehicle is manufactured at a factory, the DTC about the failure is stored in the non-volatile memory in the same way as the DTC about the failure that occurred when a driver used the vehicle. Accordingly, if the DTC is prohibited from being erased in the OBD-II, the DTC about the failure that occurred when the vehicle was manufactured at the factory cannot be erased. In this case, when the DTC is retrieved using the scan tool, it cannot be determined whether the DTC was stored due to a failure that occurred when the vehicle was manufactured at the factory, or due to a failure that occurred when a driver used the vehicle.

SUMMARY OF THE INVENTION

The invention provides a failure diagnostic apparatus that easily determines the environment in which the condition of a vehicle is examined.

A first aspect of the invention relates to a failure diagnostic apparatus that includes a vehicle-condition diagnostic portion, a plurality of failure-information storage portions, a diagnostic-environment determination portion, and a storage selection portion. The vehicle-condition diagnostic portion examines the condition of a vehicle to determine whether a failure has occurred. In the plurality of failure-information storage portions, when the vehicle-condition diagnostic portion determines that a failure has occurred, information about the failure is stored. The diagnostic-environment determination portion determines the diagnostic environment in which the vehicle-condition diagnostic portion examines the condition of the vehicle. The storage selection portion selects at least one storage portion of the plurality of failure-information storage portions, based on the diagnostic environment determined by the diagnostic-environment determination portion.

In the first aspect, the plurality of failure-information storage portions may include a volatile storage portion, and a non-volatile storage portion. The information about the failure is temporarily stored in the volatile storage portion. The information about the failure is permanently stored in the non-volatile storage portion.

In the above aspect, when the diagnostic-environment determination portion determines that the diagnostic environment is a predetermined environment, the storage selection portion may prohibit the information about the failure from being stored in the non-volatile storage portion.

A second aspect relates to a method of storing failure information. The method includes examining the condition of a vehicle to determine whether a failure has occurred; determining the diagnostic environment in which the condition of the vehicle is examined; and selecting, when it is determined that a failure has occurred, a storage location to store information about the failure, based on the determined diagnostic environment.

Thus, the invention provides the failure diagnostic apparatus that easily determines the environment in which the condition of the vehicle is examined.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a flowchart showing another process of storing failure information in the failure diagnostic apparatus according to the invention.

DETAILED DESCRIPTION OF THE EXAMPLE EMBODIMENTS

Hereinafter, each of embodiments of the invention will be described with reference to the accompanying drawings.

Figure 1:
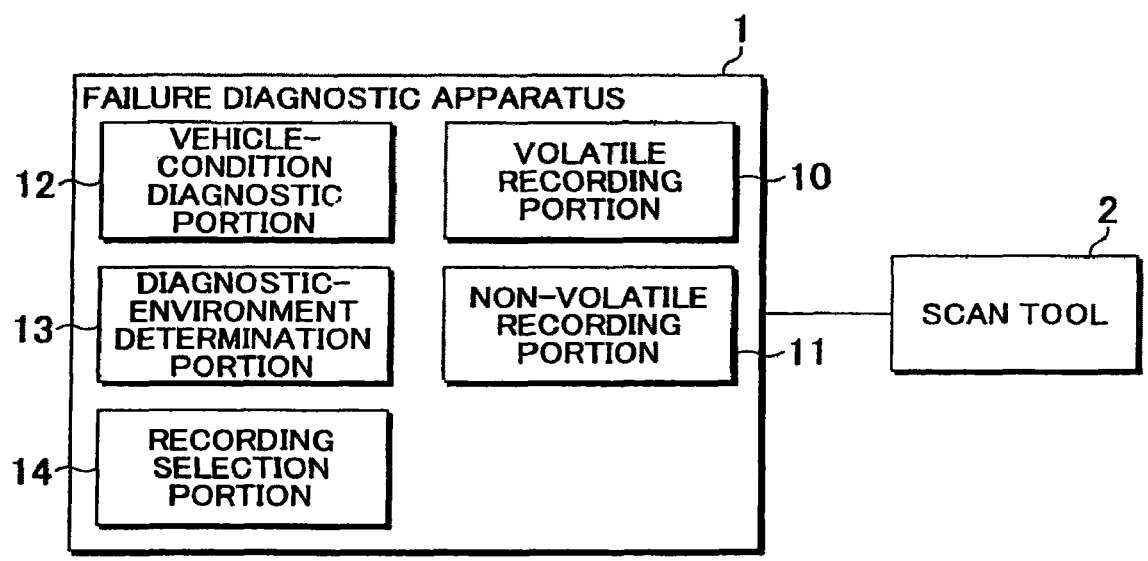
FIG. 1 is a diagram showing an example of the configuration of a failure diagnostic apparatus according to the invention.

FIG. 1 shows an example configuration of a failure diagnostic apparatus. The failure diagnostic apparatus 1 includes a volatile storage portion 10, a non-volatile storage portion 11, a vehicle-condition diagnostic portion 12, a diagnostic-environment determination portion 13, and a storage selection portion 14. The failure diagnostic apparatus is connected to a scan tool 2 via a communication line such as CAN (Controller Area Network).

The failure diagnostic apparatus 1 may be provided in at least one ECU. Alternatively, the failure diagnostic apparatus 1 may be independent of any ECU, and may control at least one ECU via the communication line such as CAN.

In the volatile storage portion 10, information about a failure or an abnormality that occurs in a vehicle (hereinafter, the information will be referred to as "failure information") is temporarily stored. For example, the volatile storage portion 10 may be semiconductor memory such as DRAM (Dynamic Random Access Memory). When supply of electric power to the volatile storage portion 10 is stopped, records are not retained in the volatile storage portion 10. In the context of this description, the phrase "records are not retained in the volatile storage portion 10" does not include the erasure of the records on purpose from the volatile storage portion 10.

In the non-volatile storage portion 11, failure information is permanently stored. For example, the non-volatile storage portion 11 may be semiconductor memory such as flash memory. Even when supply of electric power to the non-volatile storage portion 11 is stopped, records are retained in the non-volatile storage portion 11.

The vehicle-condition diagnostic portion 12 examines the condition of the vehicle. The vehicle-condition diagnostic portion 12 receives signals from, for example, an oxygen sensor, a coolant temperature sensor, an airflow sensor, and a vacuum sensor. The oxygen sensor measures the concentration of oxygen in the air supplied into a combustion chamber. The coolant temperature sensor measures the temperature of coolant used to cool an engine. The airflow sensor measures the flow amount of air supplied into the combustion chamber. The vacuum sensor measures the degree of vacuum in an inlet manifold. The vehicle-condition diagnostic portion 12 examines, for example, the combustion of fuel based on the signals, and determines whether a failure has occurred in the engine, and whether the combustion is abnormal.

The vehicle-condition diagnostic portion 12 usually examines the condition of the vehicle when the vehicle is actually in use, for example, when the vehicle is moving. The vehicle-condition diagnostic portion 12 is also used to examine the condition of the vehicle, for example, at a test that is conducted at a factory before the vehicle is shipped. Further, the vehicle-condition diagnostic portion 12 is used to examine the condition of the vehicle for troubleshooting, for example, in a repair shop.

The diagnostic-environment determination portion 13 determines the environment in which the condition of the vehicle is examined (hereinafter, referred to as "diagnostic environment"). For example, the diagnostic-environment determination portion 13 determines whether the condition of the vehicle is examined at the factory before the vehicle is shipped, or the condition of the vehicle is examined for troubleshooting in the repair shop after the vehicle has been shipped, or the condition of the vehicle is examined when the vehicle is actually in use, for example, when the vehicle is driven on a road.

The failure diagnostic apparatus 1 operates in a plurality of diagnostic modes, such as a factory-inspection mode and a monitoring mode. When the failure diagnostic apparatus 1 operates in the factory-inspection mode, the vehicle is presumed to be at the factory or the repair shop. When the failure diagnostic apparatus 1 operates in the monitoring mode, the vehicle is actually in use, for example, the vehicle is being driven on a road. The information about the plurality of diagnostic modes may be stored in the non-volatile storage portion 11. The diagnostic-environment determination portion 13 may retrieve the information about the diagnostic modes from the non-volatile storage portion 11, and may determine the diagnostic environment based on the information. The failure diagnostic apparatus 1 may change the diagnostic modes, add other diagnostic modes, or remove one or more of the diagnostic modes, using a predetermined device such as the scan tool 2.

In the failure diagnostic apparatus 1, the value of a factory-inspection completion flag may be stored in the non-volatile storage portion 11. The value of the factory-inspection completion flag indicates whether a factory inspection has been completed. In this case, the diagnostic-environment determination portion 13 retrieves the value of the factory-inspection completion flag from the non-volatile storage portion 11, and determines the diagnostic environment based on the value of the factory-inspection completion flag. In the failure diagnostic apparatus 1, the value of the factory-inspection completion flag can be changed using a predetermined device such as the scan tool 2. The failure diagnostic device 1 may prohibit the factory-inspection completion flag from being set to "off", which indicates that the factory inspection has not been completed, after the flag is set to "on", which indicates that the factory inspection has been completed. Thus, the value of the factory-inspection completion flag cannot be easily changed. This prevents a decrease in the reliability in the determination of the diagnostic environment.

In the failure diagnostic apparatus 1, when the number of times that the power source of the failure diagnostic apparatus 1 is turned on/off is less than a predetermined number of times, the factory-inspection completion flag may be set to "off". Once the number of times that the power source is turned on/off has reached or exceeds the predetermined number of times, the factory-inspection completion flag may be set to "on". If a failure occurs immediately after the vehicle is first delivered to the user, the failure is usually due to, for example, an error in the installation of a component. By setting the factory-inspection completion flag based on the number of times that the power source is turned on/off as described above, a failure that occurs immediately after the vehicle is first delivered to the user is regarded as a failure that occurs in the test conducted at the factory before the vehicle is shipped.

The storage selection portion 14 selects the storage portion in which to store the failure information detected by the vehicle-condition diagnostic portion 12, based on the diagnostic environment determined by the diagnostic-environment determination portion 13. For example, if the diagnostic-environment determination portion 13 determines that the condition of the vehicle is examined at the factory, the storage selection portion 14 selects the volatile storage portion 10, and prohibits the failure information from being stored in the non-volatile storage portion 11. Thus, for example, if a failure due to an error in the installation of a component is detected at the factory before the vehicle is shipped, the storage selection portion 14 prevents the information about the failure from being permanently stored in the non-volatile storage portion 11.

If the diagnostic-environment determination portion 13 determines that the condition of the vehicle is examined when the vehicle is moving, the storage selection portion 14 selects both of the volatile storage portion 10 and the non-volatile storage portion 11. For example, all the pieces of failure information transmitted from the sensors are stored in the volatile storage portion 10. Then, only the necessary pieces of failure information are stored in the non-volatile storage portion 11. Thus, the process of storing the failure information is efficiently performed. Also, the pieces of failure information, which need to be analyzed later by the scan tool 2, are reliably stored.

If the diagnostic-environment determination portion 13 determines that the condition of the vehicle is examined when the vehicle is running, the same failure information may be stored in both of the non-volatile storage portion 11 and the volatile storage portion 10. In this case, by storing the failure information in both of the volatile storage portion 10 and the non-volatile storage portion 11, the information can be more reliably stored in the failure diagnostic apparatus 1.

If the diagnostic-environment determination portion 13 determines that the condition of the vehicle is examined before the vehicle is shipped, the storage selection portion 14 may select only the volatile storage portion 10. If the diagnostic-environment determination portion 13 determines that the condition of the vehicle is examined after the vehicle is shipped, the storage selection portion 14 may select only the non-volatile storage portion 11. In this case, because the information is not stored in the volatile storage portion 10 after the vehicle is shipped, the process of storing the information is simplified. Also, because all the pieces of the failure information transmitted from the sensors are stored in the non-volatile storage portion 11, the detailed failure information, which needs to be analyzed later using the scan tool 2, can be reliably stored in the failure diagnostic apparatus 1.

The scan tool 2 retrieves the failure information stored in the failure diagnostic apparatus 1. For example, the scan tool 2 retrieves the failure information stored in the volatile storage portion 10 or the non-volatile storage portion 11 in real time. The scan tool 2 also retrieves the failure information stored in the non-volatile storage portion 11 later.

The phrase "the scan tool 2 retrieves the failure information in real time" signifies that the scan tool 2 retrieves the newest failure information when electric power is supplied to the failure diagnostic apparatus 1 and the failure diagnostic apparatus 1 receives the signals from the sensors. The phrase "the scan tool 2 retrieves the failure information later" signifies that the scan tool 2 retrieves the failure information that was stored in the non-volatile storage portion 11 in times past, after the power source of the failure diagnostic apparatus 1 is turned off. The failure information stored in the non-volatile storage portion 11 is retained even after the power source of the failure diagnostic apparatus 1 is turned off.

With this configuration, in the failure diagnostic apparatus 1, the storage portion in which to store the failure information is selected based on the diagnostic environment. That is, the failure information is stored in at least one of the volatile storage portion 10 and the non-volatile storage portion 11, based on the diagnostic environment. Thus, the environment in which the failure information is generated can be determined later, using the scan tool 2.

Also, in the failure diagnostic apparatus 1, the failure information generated, for example, at the factory, is not stored nor retained in the non-volatile storage portion 11. This prevents the failure information generated at the factory from being confused with the failure information generated when the vehicle is in use, in the process of determining the cause of the failure later. Thus, the cause of the failure can be more reliably determined later.

Also, in the failure diagnostic apparatus 1, the failure information generated, for example, at the factory, is prevented from being stored in the non-volatile storage portion 11. This avoids the situation in which the failure information generated at the factory is retained in the non-volatile storage portion 11, and the vehicle is regarded as having a failure history after the vehicle is shipped.

Next, the flow of the process of storing the failure information in the volatile storage portion 10 and the non-volatile storage portion 11 (i.e., failure-information storage portions) in the failure diagnostic apparatus 1 will be described with reference to FIG. 2.

First, the vehicle-condition diagnostic portion 12 examines the condition of the vehicle to determine whether a failure has occurred (step S1: vehicle-condition examination step).

If the vehicle-condition diagnostic portion 12 determines that no failure has occurred (NO in step S1), the process ends in the failure diagnostic apparatus 1. If the vehicle-condition diagnostic portion 12 determines that a failure has occurred (YES in step S1), the diagnostic-environment determination portion 13 retrieves the information about the diagnostic modes from the non-volatile storage portion 11, and determines the diagnostic environment (step S2: diagnostic-environment determination step).

If the diagnostic-environment determination portion 13 determines that the monitoring mode is selected, and the condition of the vehicle is currently examined while the vehicle is moving, for example, while the vehicle is being driven on a road (YES in step S2), the storage selection portion 14 selects both of the volatile storage portion 10 and the non-volatile storage portion 11 so that the failure information is stored in both of the storage portions 10 and 11 (step S3: storage selection step).

If the diagnostic-environment determination portion 13 determines that the factory-inspection mode is selected, and the condition of the vehicle is currently examined at the factory before the vehicle is shipped, or the repair shop (NO in step S2), the storage selection portion 14 selects only the volatile storage portion 10 so that the failure information is stored in the volatile storage portion 10 (step S4: storage selection step).

With this configuration, in the failure diagnostic apparatus 1, if the condition of the vehicle is examined at the factory or the repair shop to determine whether a failure has been corrected, and the failure information is generated at the factory or the repair shop, the failure information is stored in the volatile storage portion 10. If the failure information is generated when the vehicle is in use in an ordinary manner, the failure information is stored in the non-volatile storage portion 11. This prevents the failure information generated at the factory or the repair shop from being confused with the failure information generated when the vehicle is used in the ordinary manner. Thus, the accuracy of analyzing the failure information is improved.

In the failure diagnostic apparatus 1, only the failure information generated in a predetermined environment is stored in the non-volatile storage portion 11, without erasing unnecessary information in the non-volatile storage portion 11 using the scan tool 2.

Also, in the failure diagnostic apparatus 1, when the power source is turned off, the failure information stored in the volatile storage portion 10 is not retained.

Next, the flow of another process of storing the failure information in the volatile storage portion 10 and the non-volatile storage portion 11 (i.e., the failure-information storage portions) in the failure diagnostic apparatus 1 will be described.

Figure 2:
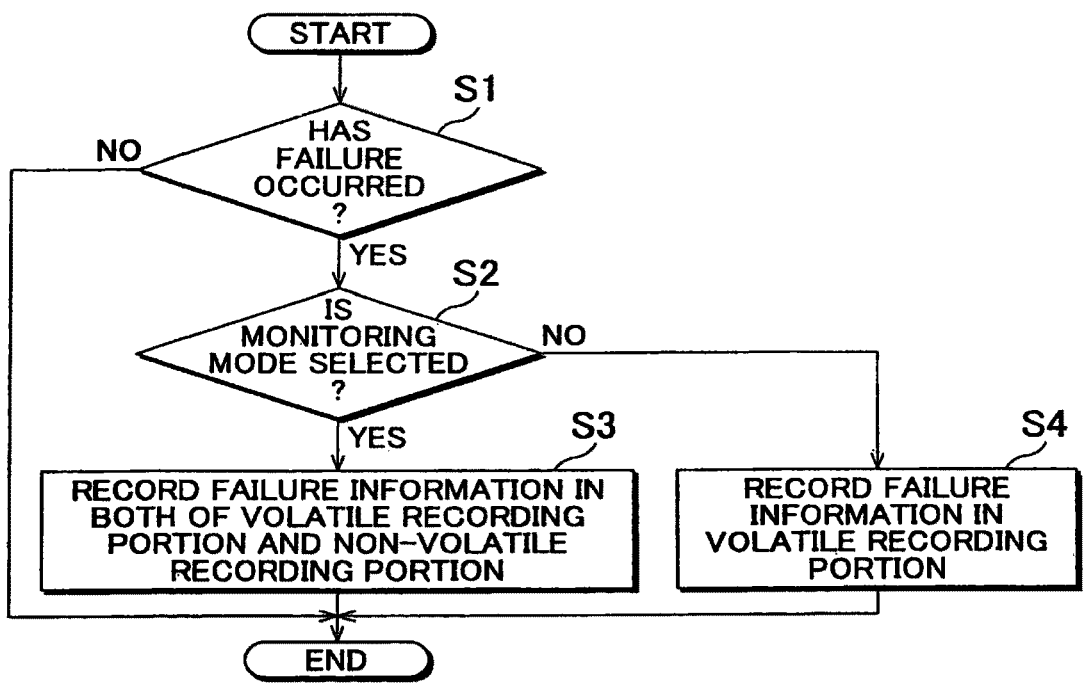
FIG. 2 is a flowchart showing a process of storing failure information in the failure diagnostic apparatus according to the invention.

In the process shown in FIG. 3, the diagnostic-environment determination step (step S12) differs from the diagnostic-environment determination step (step 2) in the process shown in FIG. 2. Other steps in the process shown in FIG. 3 are the same as those in the process shown in FIG. 2. Therefore, the description will focus on step S12.

If the vehicle-condition diagnostic portion 12 determines that the failure has occurred (YES in step S11), the diagnostic-environment determination portion 13 retrieves, from the non-volatile storage portion 11, the value of the factory-inspection completion flag that indicates whether a factory inspection has been completed, thereby determining the diagnostic environment (step S12: diagnostic-environment determination step).

If the value of the factory-inspection completion flag is "on" (ON in step S12), the storage selection portion 14 selects both of the volatile storage portion 10 and the non-volatile storage portion 11 so that the failure information is stored in both of the storage portion 10 and 11 (step S13: storage selection step).

If the value of the factory-inspection completion flag is "off" (OFF in step S12), the storage selection portion 14 selects only the volatile storage portion 10 so that the failure information is stored in only the volatile storage portion 10 (step S14: storage selection step).

With this configuration, in the failure diagnostic apparatus 1, the failure information generated before a certain time point is stored in only the volatile storage portion 10, and the failure information generated after the certain time point is stored in both of the storage portions 10 and 11. This prevents the failure information generated before the certain time point from being confused with the failure information generated after the certain time point. Thus, the accuracy of analyzing the failure information is improved.

Although example embodiments of the invention have been described in detail, the invention is not limited to the above-described embodiments. Various modifications and changes may be made to the above-described embodiments without departing from the scope of the invention.

For example, in the above-described embodiments, the failure-diagnostic apparatus 1 includes two failure-information storage portions, the volatile storage portion 10 and the non-volatile storage portion 11. At least one of the volatile storage portion 10 and the non-volatile storage portion 11 is selected based on the diagnostic environment, and the failure information is stored in the selected storage portion. However, the failure diagnostic apparatus 1 may include only the non-volatile storage portion 11. In this case, at least one of locations in the non-volatile storage portion 11 is selected based on the diagnostic environment, and the failure information is stored in the at least one selected location. With this configuration, the diagnostic environments can be classified into two or more groups, and the failure information generated in different groups of environments can be stored in different locations. Therefore, the volatile storage portion 10 can be omitted. Even when the failure diagnostic apparatus 1 includes both of the volatile storage portion 10 and the non-volatile storage portion 11, failure information may be stored in at least one location in the non-volatile storage portion 11 based on the diagnostic environment.

What is claimed is:

1. A failure diagnostic apparatus, comprising:
   a vehicle-condition diagnostic portion that examines the condition of a vehicle to detect a failure;
   a plurality of failure-information storage portions in which information about the failure detected by the vehicle-condition diagnostic portion is stored, the plurality of failure information storage portions including a non-volatile storage portion;
   a diagnostic-environment determination portion that determines whether the condition of the vehicle is examined when the vehicle is actually in use and whether the condition of the vehicle is examined either at a test that is conducted before the vehicle is shipped or for troubleshooting after the vehicle is shipped;
   a storage selection portion that selects at least one storage portion of the plurality of failure-information storage portions to store the information about the failure, based on a result of determination performed by the diagnostic-environment determination portion, so that information about the failure generated when it is determined that the condition of the vehicle is examined when the vehicle is actually in use, is stored in the non-volatile storage portion; and
   a diagnostic mode storage portion that stores, in the non-volatile storage portion, information about diagnostic modes including a factory-inspected mode indicating that the condition of the vehicle is examined at a factory or a repair shop, and a monitoring mode indicating that the condition of the vehicle is examined when the vehicle is actually in use,
   wherein the diagnostic-environment determination portion determines a diagnostic environment based on the information stored by the diagnostic mode storage portion.

2. The failure diagnostic apparatus according to claim 1, wherein the plurality of failure-information storage portions further includes a volatile storage portion in which the information about the failure is temporarily stored.

3. The failure diagnostic apparatus according to claim 2, wherein the storage selection portion prohibits the information about the failure from being stored in the non-volatile storage portion when the diagnostic-environment determination portion determines that the condition of the vehicle is examined at the test that is conducted before the vehicle is shipped, or the condition of the vehicle is examined for troubleshooting after the vehicle is shipped.

4. The failure diagnostic apparatus according to claim 1, further comprising:
   an information determination portion that determines whether the information about the failure is first information that is temporarily needed, or second information that is permanently needed, wherein
   the non-volatile storage portion includes a first non-volatile storage portion and a second non-volatile storage portion;
   if the information determination portion determines that the information about the failure is the first information, the storage selection portion selects the first non-volatile storage portion; and
   if the information determination portion determines that the information about the failure is the second information, the storage selection portion selects the second non-volatile storage portion.

5. A failure diagnostic apparatus, comprising:
a failure-determination portion that determines whether a failure has occurred in a vehicle;
a vehicle-environment determination portion that determines whether the condition of the vehicle is examined when the vehicle is actually in use and whether the condition of the vehicle is examined either at a test that is conducted before the vehicle is shipped or for troubleshooting after the vehicle is shipped;
an information determination portion;
a plurality of failure-information storage portions in which information about the failure detected by the failure-determination portion is stored, the plurality of failure-information storage portions including a non-volatile storage portion; and
a diagnostic mode storage portion that stores, in the non-volatile storage portion, information about diagnostic modes including a factory-inspected mode indicating that the condition of the vehicle is examined at a factory or a repair shop, and a monitoring mode indicatinq that the condition of the vehicle is examined when the vehicle is actually in use,
wherein the diagnostic-environment determination portion determines a diagnostic environment based on the information stored by the diagnostic mode storage portion,
wherein, when the failure-determination portion determines that the failure has occurred, the vehicle-environment determination portion determines an environment around the vehicle and the information determination portion determines whether information about the failure is first information that is temporarily needed, or second information that is permanently needed, based on the determined environment around the vehicle; and the first information and the second information are stored in different portions in the plurality of failure-information storage portions, and
wherein information about the failure generated when it is determined that the condition of the vehicle is examined when the vehicle is actually in use, is stored in the non-volatile storage portion.

6. The failure diagnostic apparatus according to claim 5, wherein
the plurality of failure-information storage portions further includes a volatile storage portion, the first information is stored in the volatile storage portion, and the second information is stored in the non-volatile storage portion.

7. A method of storing information about a failure that has occurred in a vehicle, comprising:
examining a condition of a vehicle to detect a failure;
determining whether the condition of the vehicle is examined when the vehicle is actually in use and whether the condition of the vehicle is examined either at a test that is conducted before the vehicle is shipped or for troubleshooting after the vehicle is shipped;
selecting a storage portion to store information about the failure, based on a result of the determining, when the failure is detected, wherein a non-volatile storage portion is selected to store information about the failure generated when it is determined that the condition of the vehicle is examined when the vehicle is actually in use; and
storing, in the non-volatile storage portion, information about diagnostic modesincluding a factory-inspected mode indicating that the condition of the vehicle isexamined at a factory or a repair shop, and a monitoring mode indicating that thecondition of the vehicle is examined when the vehicle is actually in use, wherein adiagnostic environment is determined based on the stored information about thediagnostic modes.

* * * * *